United States Patent Office 3,004,023
Patented Oct. 10, 1961

3,004,023
3-ALKYLTHIO-17α-CARBOXYETHYLANDROSTA-3,5-DIEN-17β-OL LACTONES AND PROCESS
Robert C. Tweit, Wilmette, Ill., assignor to G. D. Searle & Co., Chicago, Ill., a corporation of Delaware
No Drawing. Filed Mar. 23, 1960, Ser. No. 16,919
4 Claims. (Cl. 260—239.57)

This invention relates to 3-alkylthio-17α-carboxyethyl-androsta-3,5-dien-17β-ol lactones and a process for the manufacture thereof. More particularly, this invention relates to chemical compounds of the formula

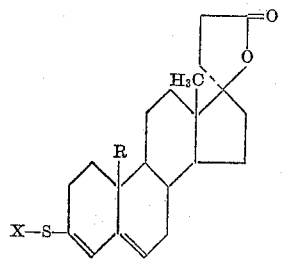

wherein X represents an alkyl radical and R represents hydrogen or a methyl radical.

Among the alkyl radicals represented by X, especially lower alkyl radicals are preferred, which is to say methyl, ethyl, propyl, isopropyl, butyl, isobutyl, sec-butyl, tert-butyl, pentyl, isopentyl, tert-pentyl, neopentyl, hexyl, isohexyl, heptyl, and like $C_nH_{2n+1}$ radicals wherein $n$ is a positive integer amounting to less than 9.

Equivalent to the foregoing lactones for purposes of this invention are the corresponding hydroxy acids and their alkali salts of the formula

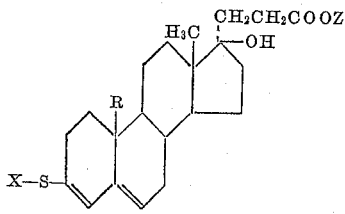

wherein X and R have the meansings assigned above, and Z represents hydogen, an alkali metal, or the ammonium radical. Those skilled in the art will appreciate that the described salts readily derive from the corresponding lactones on contact with aqueous alkali. The free acids, in turn, are obtained from the salts by a critically brief exposure to a proton source; prolongation of the exposure time induces lactonization.

The compounds to which this invention relates are useful because of their valuable pharmacological properties. For example, they are potent diuretics, being adapted to block the effect of desoxycorticosterone acetate on urinary sodium and potassium.

Manufacture of the subject compounds proceeds by contacting a 3-oxo steroid of the formula

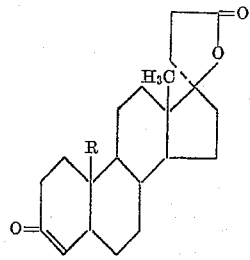

with a lower alkyl mercaptan in an alcoholic medium such as methanol, ethanol, 2-propanol, etc., there being a trace of mineral acid present. The definition of R remains as before.

The following examples describe in detail compounds illustrative of the present inventon and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

*17α-carboxyethyl-3-methylthioandrosta-3,5-dien-17β-ol lactone*

To a solution of 34 parts of 17α-carboxyethyl-17β-hydroxyandrost-4-en-3-one lactone, preparable by the procedure described in U.S. 2,705,712, in 1000 parts of methanol is added 10 parts of liquid methyl mercaptan and 1 part of concentrated sulfuric acid. The precipitate which forms is filtered off and washed on the filter with ether. The product thus obtained is 17α-carboxyethyl-3-methylthioandrosta-3,5-dien-17β-ol lactone, M.P. 237–241°, the formula of which is

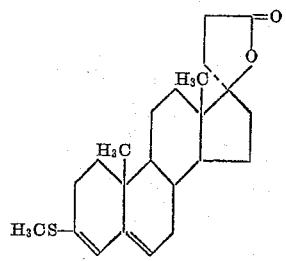

EXAMPLE 2

*17α-carboxyethyl-3-methylthio-19-norandrosta-3,5-dien-17β-ol lactone*

To a solution of 117 parts of 17α-carboxyethyl-17β-hydroxy-19-norandrost-4-en-3-one lactone, preparable by the procedure described in U.S. 2,918,463, in 3500 parts of methanol is added 50 parts of liquid methyl mercaptan and 8 parts of concentrated sulfuric acid. The resultant mixture is cooled to insure complete precipitation of the solid product thrown down. The precipitated material, filtered off and washed on the filter, melts at 166–168°. This material is 17α-carboxyethyl-3-methylthio-19-norandrosta-3,5-dien-17β-ol lactone, of the formula

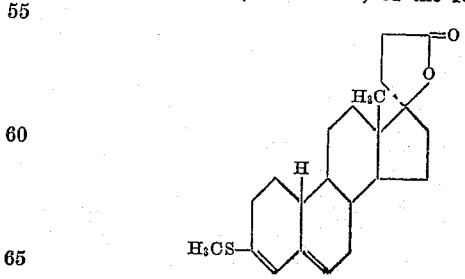

EXAMPLE 3

*17α-carboxyethyl-3-ethylthioandrosta-3,5-dien-17β-ol lactone*

Substitution of 12 parts of ethyl mercaptan for the methyl mercaptan called for in Example 1 affords, by the procedure there detailed, 17α-carboxyethyl-3-ethylthio-androsta-3,5-dien-17β-ol lactone, of the formula

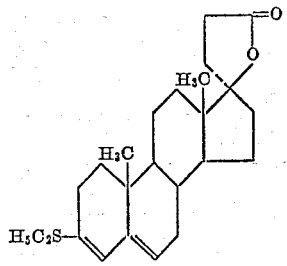

What is claimed is:
1. A compound of the formula

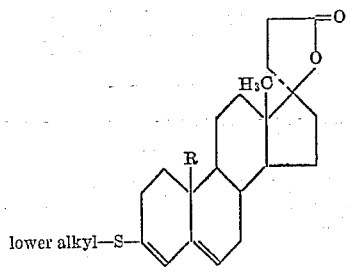

wherein R represents a member of the group consisting of hydrogen and a methyl radical.
2. 17α-carboxyethyl-3-methylthioandrosta-3,5-dien-17β-ol lactone.
3. 17α-carboxyethyl-3-methylthio-19-norandrosta-3,5-dien-17β-ol lactone.

4. In a process for the manufacture of compounds of the formula

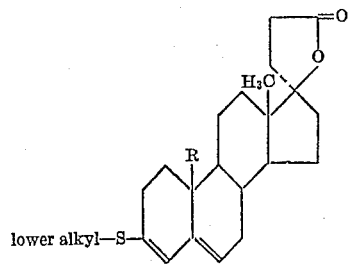

wherein R represents a member of the group consisting of hydrogen and a methyl radical, the step which comprises contacting a 3-oxo steroid of the formula

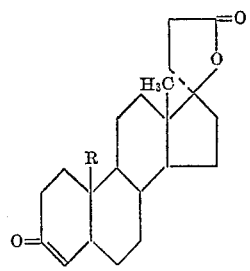

with a lower alkyl mercaptan in a liquid alcohol solution containing sulfuric acid, R in the formula of the 3-oxo steroid being defined as before.

No references cited.

UNITED STATES PATENT OFFICE
CERTIFICATE OF CORRECTION

Patent No. 3,004,023                              October 10, 1961

Robert C. Tweit

It is hereby certified that error appears in the above numbered patent requiring correction and that the said Letters Patent should read as corrected below.

Column 1, lines 61 to 71, and column 4, lines 17 to 28, the formula, in each occurrence, should appear as shown below instead of as in the patent:

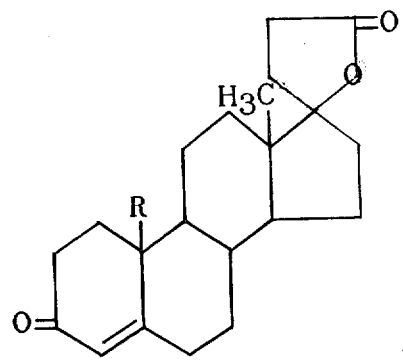

Signed and sealed this 8th day of May 1962.

(SEAL)
Attest:

ERNEST W. SWIDER
Attesting Officer

DAVID L. LADD
Commissioner of Patents